Figure 1:
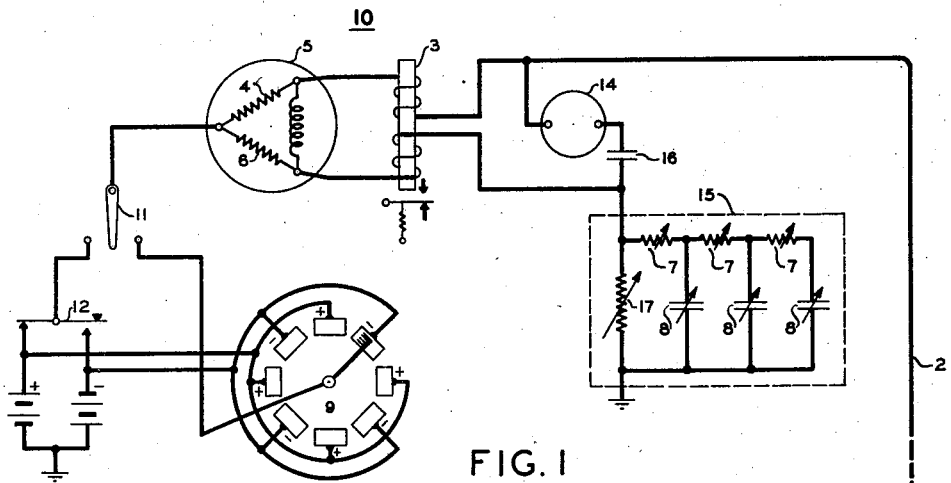

Oct. 13, 1931.  A. F. CONNERY ET AL  1,826,736

ALTERNATING CURRENT BALANCE INDICATOR

Filed July 1, 1930

INVENTOR
ALDER F. CONNERY
RONALD S. WISHART
BY
ATTORNEY

Patented Oct. 13, 1931

1,826,736

UNITED STATES PATENT OFFICE

ALDER F. CONNERY, OF BROOKLYN, AND RONALD S. WISHART, OF ROCKVILLE CENTER, NEW YORK, ASSIGNORS TO INTERNATIONAL COMMUNICATIONS LABORATORIES, INC., OF NEW YORK, N. Y., A CORPORATION OF NEW YORK

ALTERNATING CURRENT BALANCE INDICATOR

Application filed July 1, 1930. Serial No. 465,228.

This application relates to communication systems and more particularly to a system for determining the degree of balance between a line and an artificial line.

As is well known in the art, a balance must be maintained between a real line and an artificial line in order that reception of signals over a duplex telegraph circuit may be undisturbed. The artificial line is made up of a plurality of variable resistances to balance the resistance of the line and a plurality of variable condensers with variable resistances in series with them, to balance the capacity of the line. There also may be in the artificial line one or more fixed condensers with or without resistances in series with them. In some cases there may be either a fixed or variable inductance inserted in the artificial line. The artificial line is thus constructed to contain within its limits of variation some combination of resistance, timed capacity and inductance which will closely simulate the real line which it is to balance.

The real or main line conditions vary with weather and changes in wires. In order to keep the artificial line and real line in a state of balance some means must be provided for indicating the amount of current in each, the difference between them indicating the amount of resistance unbalance. In addition, some method must be provided to indicate the capacity unbalance between the two.

The resistance unbalance in differential duplex circuits has ordinarily been indicated by means of a differential milliammeter mounted at the split of the real line and artificial line paths with one winding in series with each. A differential polar relay has a winding in series with each of these paths also. In bridge duplex circuits the milliammeter is non-differential and is mounted in series with the winding of a polar relay connecting the inductance or resistance bridge arms of the duplex in a manner well understood in the art. If a state of unbalance exists, the milliammeter needle will be moved to another position at each operation of a key which applies negative or positive current alternately to the split of differential or bridge duplexes. By adjusting the resistances in the artificial line, the needle can be made to rest approximately in one position while the key is operated. The artificial line is then said to be balanced with the real line for resistance.

The capacity balance is usually obtained from the same meter or sometimes from an undulator, an instrument similar to a relay having some inking means attached to its armature in such a manner that it traces a signal on a tape moved under the inking means. In the first case, momentary deflections are observed on the milliammeter each time the key in the split is operated and the condensers and timing resistances are adjusted until the deflections disappear. The objections to this method are: that the kicks or deflections are at the most slight and are often difficult to observe if there is much induction on the real line induced from adjoining circuits or from power lines; furthermore, investigation has shown that the differential direct current milliammeter is not sensitive to this type of disturbance resulting from capacity unbalance which at certain adjustments of timing and capacity in the artificial line have alternating current frequencies of the order of 450 cycles per second, varying from that down to frequencies of the order of the frequency of the signal impressed at the split of the artificial line. It is difficult, if not impossible, to observe the effect of timing resistance adjustment upon the capacity balance.

Where the undulator is used to obtain the capacity balance, it is inserted in a circuit across the arms of the duplex in the case of either the differential or bridge duplexes. The real line is thrown to ground at the distant end and distant battery removed. In the case of the milliammeter balance the line is usually left in connection with battery at the distant end. In balancing with the undulator, kicks in the line traced by the inking means are observed and the condensers and timing resistances adjusted until the disturbance due to the operation of the key in the split is eliminated. The difficulties with this method are: the disturbance similar to that on the meter due to induction which makes difficult the observation of the capacity kicks; the different degrees of sensitivity of the undulator due to variation in pressure of the marking means on the moving tape; the necessity for observing the capacity kicks from a constantly travelling tape, and constantly referring back to an ever lengthening strip to determine whether improvement in balance is being obtained. Another objection is the balancing of the line when not in its normal operating condition. It is apparent from the foregoing that there is need for improvement in the method of indicating the degree of capacity unbalance, and it is also desirable to have a means of indicating the amount of induction on a line to determine whether it is operable.

It is the principal object of the invention to provide a system of obtaining a capacity balance free from the above objections as to method, and which shall be practically exact. It has another object, that of making the obtaining of an accurate capacity balance an easy matter. A further object of the invention is the determining by approximation of the amount of induction on the line.

A further object of the invention is to provide a capacity unbalance which may be read in terms of current value with such amplitude of movement of the instrument needle that changes in the balance due to adjustment can be easily read. The instrument provided has light moving parts and is highly damped, so that the needle maintains a relatively steady position notwithstanding variations in line induction.

Still another object of the invention is the provision of a method of balancing which does not require the distant operator to ground the line while a balance is being taken, thus balancing the line in its normal operating condition.

A more clear conception of the operation, details and further objects of this system may be had from the following description, taken in conjunction with the accompanying drawings in which:—

Figure 1 discloses the circuit employing the invention.

Figure 2:
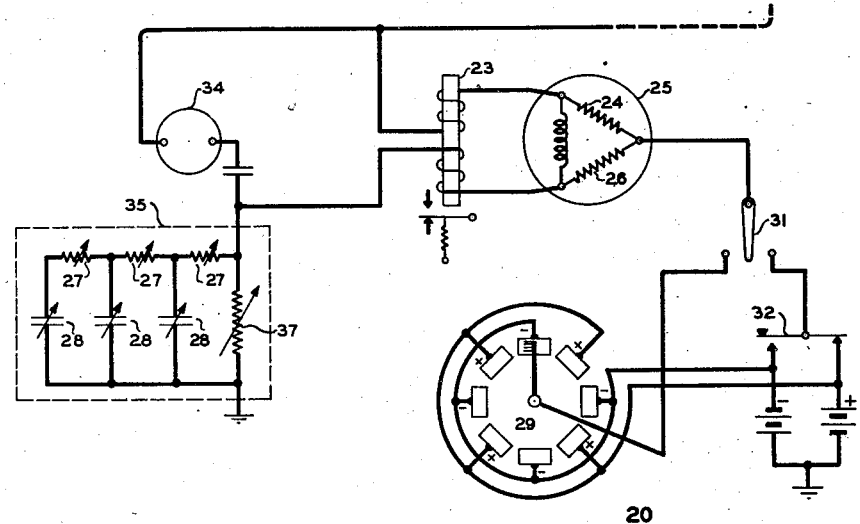
Figure 2:
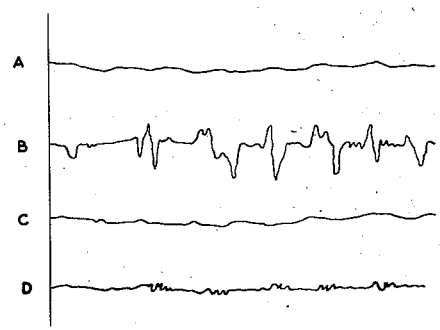

Fig. 2 is a series of graphs showing the relation of the currents in an unbalanced system.

Fig. 1 discloses a line or cable 2 connecting two stations 10 and 20. As the apparatus at each station is the same, only one set-up need be described. A polarized line relay 3 is connected to the main line through one of its windings and thence to winding 4 of a differential D. C. milliammeter 5. Winding 6 of the milliammeter is connected through the other winding of relay 3 to the artificial line 15 which is composed of variable condensers 8 and variable resistances 7 and a large variable resistance 17. The apex of meter 5 is connected to a two-point switch 11, one point of which is connected to a key 12 adapted to contact with positive or negative battery.

The second point of switch 11 connects with a motor driven commutator 9 which provides A. C. current of a frequency within the signal range of the line. It may be a specially provided commutator or it may be a portion of the distributor.

A highly air damped galvanometer 14 is bridged in series with a condenser 16 across the line 2 and the artificial line 15. It has not been thought necessary to disclose the galvanometer 14 in detail as it may be of any well known make though specially designed to meet the requirements of this circuit, comprising a rotatable armature positioned between two laminated pole pieces. Secured to the armature is a pointer which is maintained in its left position by a retractile spring. This meter is provided with an 0 to 10 scale and is preferably calibrated two milliamperes, per scale division. The meter reads the value of either A. C. or D. C. currents passing through it and registers them by movement to the right.

The condenser 16 is provided to prevent the flow of direct current while balancing and eliminates the necessity of having the distant station ground the line while a balance is being taken. The value of the capacity is such that in conjunction with the inductance and resistance of the meter, A. C. frequencies from 0 to 450 cycles will pass through the circuit.

While this disclosure shows the meter and a condenser bridged across the arms of the duplex, it should be understood that it is possible to mount a differential alternating current meter with a winding in each of the duplex arms and dispense with the condenser, and that theoretically, this is the best position for the meter, but that practical considerations of types of meters available and consideration of ease of making connections are the reasons for the present form of the circuit.

The use of the A. C. commutator having a frequency preferably within the signalling range sets up a condition which simulates the actual signaling conditions and the A. C. meter indicates the difference between the value and phase relation of the capacity and inductive kicks in the artificial line and the main line, thereby indicating the degree of unbalance.

The procedure in balancing a circuit is to move the switch 11 to the left and the key 12 is slowly operated and resistance 17 is adjusted until the needle of meter 5 gives equal readings with the key open and closed. This is called a resistance balance.

A reading is now taken on the A. C. balance indicator 14 and note is made of the deflection which is due to the induction in the main line. Assuming that the scale of this meter is calibrated from 0 to 20 milliamperes in two milliamperes divisions, the reading due to induction may be assumed to be from 4 to 6 milliamperes.

The switch 11 is now moved to the right and the commutator 9 is started and a reading is again taken on indicator 14 which is an indication of unbalance due to capacity, plus the amount of induction. This may be 18 milliamperes. Condensers 8 and retardation resistance 7 are now adjusted until the indicator reads between 4 and 6 at which point the line is in a state of balance.

Fig. 2 discloses a series of oscillograms in which A indicates the induction in a certain line, B a condition of unbalance and C a condition of balance. D represents another condition of unbalance due to wrong adjustment of timing resistances. It will be noted that C does not exactly duplicate A. This is due to the fact that it is almost impossible to obtain a perfect balance.

It is sometimes found that the balance cannot be reduced to the value of the induction 4 and 6 and that the best possible balance is several milliamperes above the induction value. This is commonly due to the effect of the impedance of the windings of the distant terminal duplex relays, the margin of unbalance being greater the larger that impedance is. It is also sometimes due to lump inductances occurring in the line wire itself, as in the case of intermediate composite equipment.

In the above description, the frequency of the A. C. applied to the split of he duplex has been stated as preferably within the signalling range of the circuit. When inductance exists to a noticeable extent in the communication circuit, and if not compensated in the artificial line, a balance obtained with an A. C. frequency equal to the maximum frequency of operation of the circuit may not be satisfactory for the lowest frequencies, and vice versa. A relation of frequencies in operation may be from five to thirty cycles per second, for instance.

In this case, an alternating current balancing frequency of an average value of 18 cycles may give a better balance for all frequencies.

It is obvious from the foregoing that the method outlined is not limited in its use to obtaining a balance on the forms of networks described, but can be used in conjunction with other types of networks.

What is claimed is:

1. In a telegraph system, a real line, an artificial line, means for indicating the resistance unbalance between said lines, and means for indicating the induction on said real line and for indicating the capacity unbalance between said lines.

2. In a telegraph system, a real line, an artificial line a milliammeter for indicating the resistance unbalance between said lines, and a galvanometer for indicating the capacity unbalance of said lines.

3. In a telegraph system, a real line, an artificial line, means for indicating the resistance unbalance between said lines, and separate means for indicating the capacity unbalance of said lines while said real line is operative.

4. In a telegraph system, a real line, an artificial line, an air damped galvanometer, said galvanometer being connected between said real and artificial lines for indicating the induction on said real line and the degree of capacity unbalance between said lines.

5. In a telegraph system, a real line, an artificial line, a polarized relay, a differential D. C. milliammeter connected to said lines through said relay and to a two-point switch, a key connected to one of the points of said switch, positive and negative battery under the control of said key, a commutator to provide A. C. current connected to said batteries and under the control of the other point of said switch, and a galvanometer and a condenser bridged across said lines.

6. In a telegraph system, a real line, an artificial line, a polarized relay, a differential D. C. milliammeter connected to said lines through said relay and to a two-point switch, a key connected to one of the points of said switch, positive and negative battery under the control of said key, a commutator to provide A. C. current at a frequency within the signalling range and under the control of the other point of said switch, and a galvanometer and a condenser bridged across said lines.

7. In a communication system, a method of ascertaining the degree of unbalance between two lines comprising manually impressing currents of opposite polarity on said lines to obtain an indication of resistance unbalance, and thereafter impressing alternating current of a frequency within the signalling range on said lines to obtain an indication of capacity unbalance.

8. In a communication system, the method of ascertaining the capacity unbalance between two lines comprising taking a reading indicating the induction, impressing alternating current on said lines, taking a second reading to ascertain the capacity unbalance, and then adjusting one of said lines to approximate the first reading.

9. In a communication system, the method of ascertaining the capacity unbalance between two lines comprising taking a reading indicating the induction, impressing alternating current on said lines of a frequency within the signalling range, taking a second reading to ascertain the capacity unbalance and then adjusting one of said lines to eliminate said capacity unbalance.

10. In a communication system, the method of ascertaining the capacity unbalance between two lines comprising taking a reading indicating the induction, impressing alternating current on said lines of a frequency within the signalling range, taking a second reading indicating the induction and capacity unbalance, and then adjusting one of said lines to approximate the first reading.

11. In a telegraph system, the method of eliminating a state of unbalance between a real line and its artificial line consisting in ascertaining the resistance unbalance, correcting such unbalance, ascertaining the induction of the line, impressing alternating current of a frequency within the signalling range on said lines, to ascertain the state capacity unbalance therein, and then correcting said capacity unbalance.

12. In a communication system, a method of balancing two lines comprising alternately impressing current of opposite polarity on said lines, taking a reading of resistance unbalance therebetween, adjusting the resistance in one of said lines until a resistance balance is obtained, taking a reading of the induction in said lines, impressing alternating current on said lines of a frequency within the signalling range, taking a second reading indicating the induction and capacity unbalance, and then adjusting the line to eliminate the capacity unbalance.

In witness whereof we hereunto subscribe our names this 30th day of June, 1930.

ALDER F. CONNERY.
RONALD S. WISHART.